United States Patent [19]

Cavil et al.

[11] 4,131,832
[45] Dec. 26, 1978

[54] SPEED SENSITIVE FIELD WEAKENING CONTROL FOR TRACTION MOTORS

[75] Inventors: David T. Cavil, Menomonee Falls, Wis.; Gerald N. McAuliffe, Lincoln, Nebr.; Russell J. Van Rens, Waukesha, Wis.

[73] Assignee: Outboard Marine Corporation, Waukegan, Ill.

[21] Appl. No.: 787,426

[22] Filed: Apr. 14, 1977

[51] Int. Cl.² .............................................. H02P 7/00
[52] U.S. Cl. .................................. 318/358; 318/334; 318/251; 318/473; 318/533
[58] Field of Search ................ 318/358, 357, 350, 334, 318/251, 249, 473, 533

[56] References Cited

U.S. PATENT DOCUMENTS

| 2,165,082 | 7/1939 | Weber | 318/473 X |
| 3,384,799 | 5/1968 | Thiele | 318/358 X |
| 4,035,704 | 7/1977 | York | 318/358 |

Primary Examiner—Herman J. Hohauser
Attorney, Agent, or Firm—Michael, Best & Friedrich

[57] ABSTRACT

Disclosed herein is a control for a direct current motor including a field weakening solenoid switch including a solenoid coil, which control includes a switch connected in series with a coil for connecting and disconnecting the coil to a source of direct current, and a device responsive to motor speed for operating the switch.

Also disclosed herein is an overspeed control for a direct current motor including a solenoid switch which controls energization of the direct current motor, which is biased open, and which includes a solenoid coil operable in response to energization thereof to close the switch, which overspeed control comprises a switch connected in series with the coil for selectively connecting the coil to a source of direct current, and a device responsive to motor speed for operating the switch.

41 Claims, 3 Drawing Figures

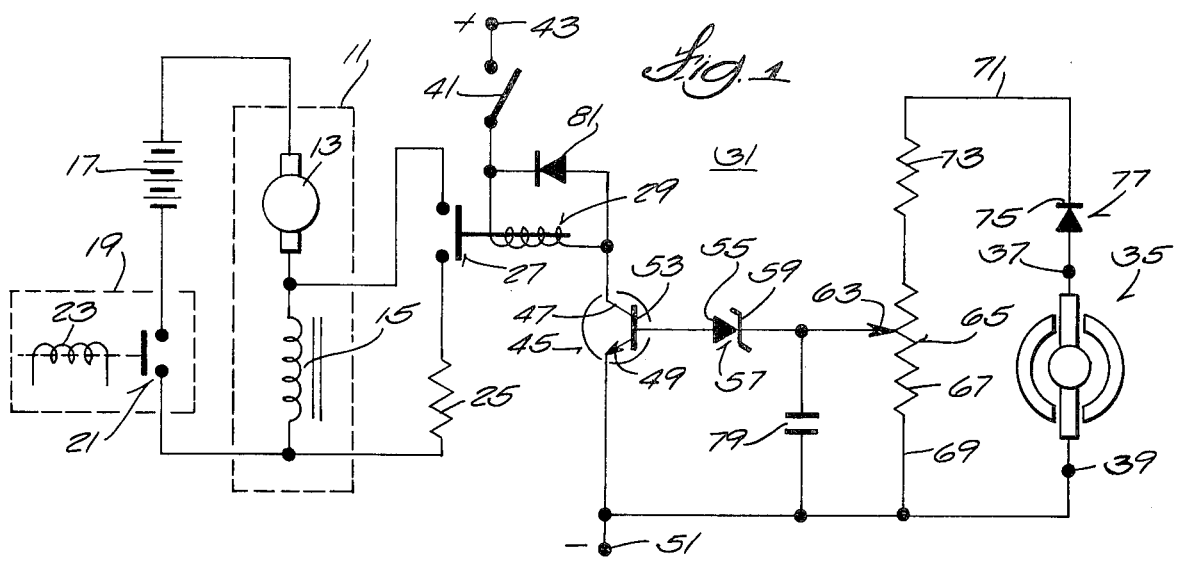

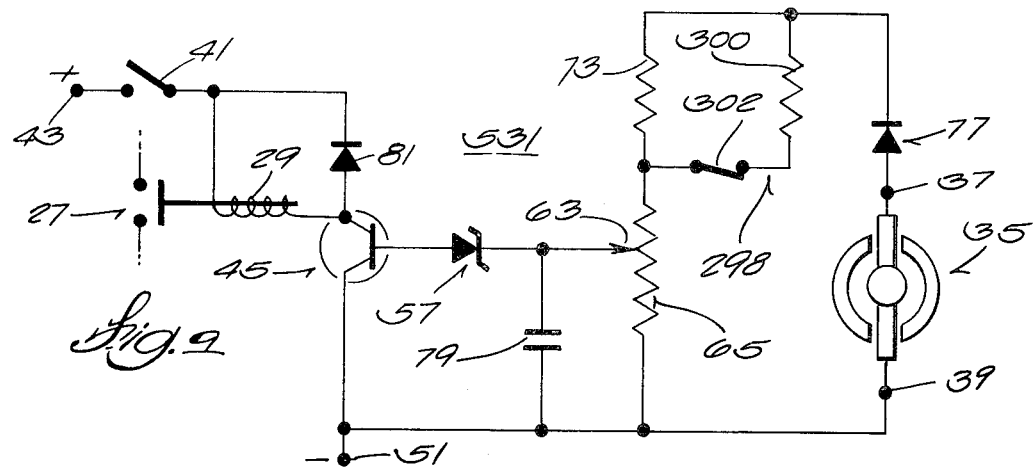
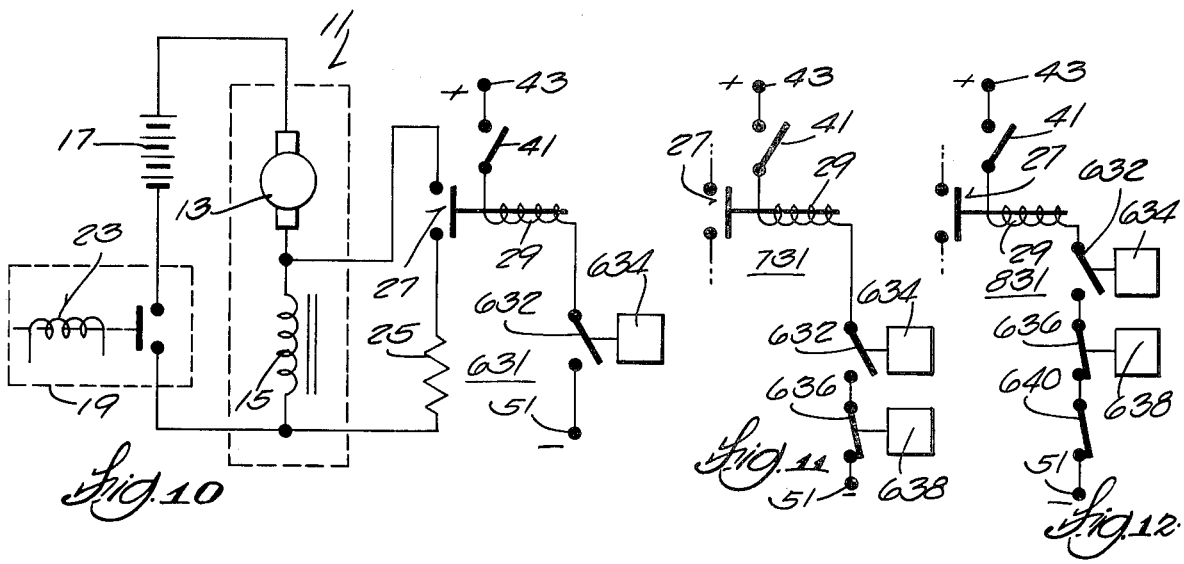
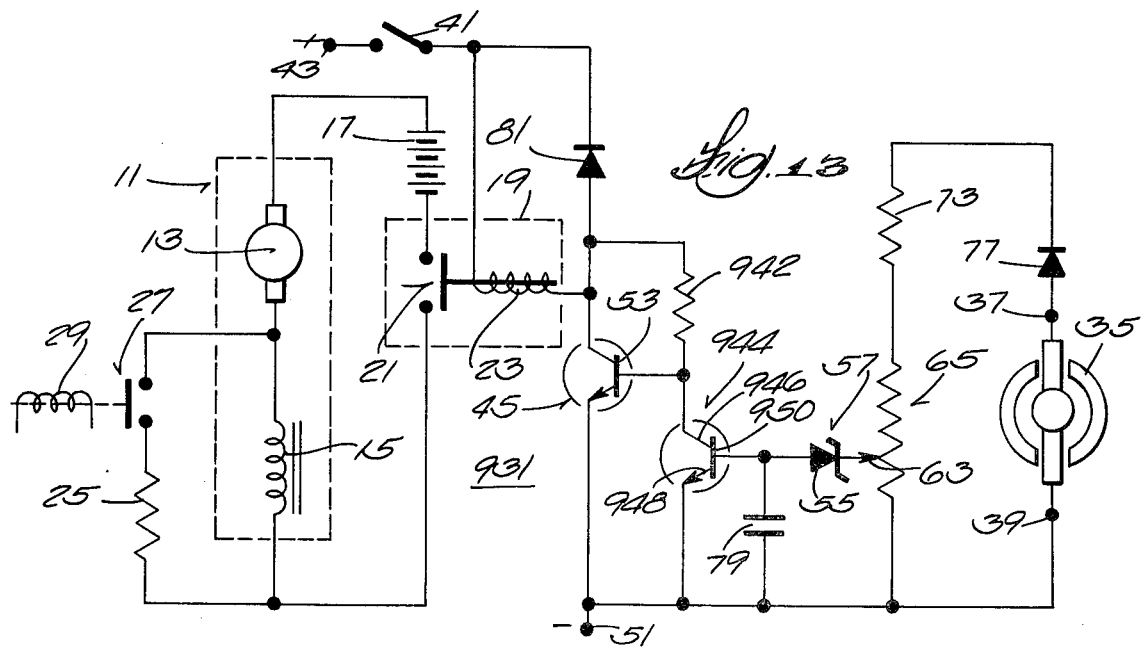

SPEED SENSITIVE FIELD WEAKENING CONTROL FOR TRACTION MOTORS

BACKGROUND OF THE INVENTION

The invention relates generally to control of direct current traction motors.

The invention also relates, more particularly, to control of direct current traction motors having a field weakening resistor and, still more particularly, to control arrangements for connecting and disconnecting the field weakening resistor in parallel with the field winding of such motors.

The invention also relates to overspeed control of direct current traction motors.

SUMMARY OF THE INVENTION

The invention provides a control for a direct current motor including a field weakening solenoid switch including a solenoid coil, which control includes switch means connected in series with the coil for selectively connecting the coil to a source of direct current, and means responsive to motor speed for operating the switch means.

In accordance with one embodiment of the invention, the speed responsive means comprises mechanical means for operating the switch means, which mechanical means can comprise a governor rotated by the motor for operating the switch means. The switch means can comprise a first switch which is operated by the governor and which is open below a given governor speed and which is closed above a given governor speed. In addition, the control can include a second switch responsive to motor temperature and connected in series with the first switch, which second switch is closed below a predetermined temperature and opened above the predetermined temperature. Still further in addition, the control can include a second governor rotated by the motor and a third switch which is connected in series with the first and second switches, which is operated by the second governor, and which is closed below a given governor speed and opened above a given governor speed.

In one embodiment in accordance with the invention, the switch means comprises an electronic switch and the speed responsive means comprises means for generating an electrical signal proportional to motor speed, and circuit means for applying the signal to operate the switch.

In one embodiment in accordance with the invention, the circuit means includes means for preventing operation of the switch to connect the coil to the source of direct current so as to weaken the field in the absence of motor operation above a given speed. The circuit means can also include means for preventing operation of the switch to connect the coil to the source of direct current so as to weaken the field when the motor is operating above a second given speed higher than the above mentioned given speed. In addition, the circuit means can include means responsive to motor temperature for modifying the operation of the switch.

In one embodiment in accordance with the invention, the electronic switch is a transistor having a collector-emitter path connected in series with the solenoid coil and with the source of direct current, which transistor also includes a base, and the means for preventing operation of the switch in the absence of motor operation above a given speed comprises a zener diode having an anode connected to the base and a cathode, and a potentiometer including a resistor connected to the signal generating means, which potentiometer also includes a wiper connected to the zener diode cathode and set to turn on the transistor in response to motor speed above a predetermined level.

In one embodiment in accordance with the invention, the means for preventing operation of the switch when the motor is operating above the second given speed includes a second transistor having a collector-emitter path extending from the wiper of the first mentioned potentiometer in parallel with the collector-emitter path of the first transistor, which second transistor also includes a base, together with a second zener diode having an anode connected to the base of the second transistor and a cathode, and a second potentiometer including a resistor connected to the signal generating means in parallel with the connection of the first mentioned potentiometer, which second potentiometer also includes a second wiper connected to the second zener diode cathode and set to turn on the second transistor in response to motor speed above the second given speed.

In one embodiment in accordance with the invention, the switch means comprises an electronic switch and the speed responsive means comprises means for generating an electric signal proportional to motor speed, together with circuit means for selectively applying the signal to operate the switch so as to connect the solenoid coil to the source of direct current when the motor is operating at or above either of two speeds.

In one embodiment, the electronic switch comprises a first transistor having a collector-emitter path connected in series with the solenoid coil and with the source of direct current, which transistor also includes a base, and the circuit means comprises first means connected to the base of the transistor for turning on the transistor in response to motor speed at or above the higher of the two motor speeds, second means connected to the base of the transistor for selectively turning on the transistor independently of motor speed, and third means connected to the collector-emitter path of the transistor for preventing connection of the coil to the direct current source in the absence of a motor speed at or above the lower of the two motor speeds.

The invention also provides a control for a direct current motor including a field weakening solenoid switch including a solenoid coil, said control including switch means connected in series with the coil for selectively connecting the coil to a source of direct current, and means responsive to motor temperature for operating the switch means.

The invention also provides an overspeed control for a direct current motor including a solenoid switch which controls energization of the direct current motor, which is biased open, and which includes a solenoid coil operable in response to energization thereof to close the switch, which overspeed control comprises switch means connected in series with the coil for selectively connecting the coil to a source of direct current, and means responsive to motor speed for operating the switch means.

In one embodiment in accordance with the invention, the switch means comprises an electronic switch and the speed responsive means comprises means for generating an electrical signal proportional to motor speed, and circuit means for applying the signal to operate the switch. In addition, the electronic switch can comprise a first transistor having a collector-emitter path connected in series with the coil, and a base, the control can include means for applying potential to the base of the first transistor to turn on the first transistor independently of motor speed, the speed responsive means can comprise means for generating a signal proportional to motor speed, and the circuit means can include means for applying the signal to turn off said first transistor in response to operation of the motor above a predetermined speed.

In one embodiment, the circuit means comprises a second transistor having a collector-emitter path connected to the base of the first transistor, which second transistor also includes a base, together with a zener diode having an anode connected to the base of the second transistor and a cathode, and a potentiometer having a resistor connected to the signal generating means, which potentiometer also includes a wiper connected to the cathode of the zener diode and set so as to turn on the second transistor and thereby turn off the first transistor in response to operation of the motor above the predetermined speed.

The invention provides means responsive to motor speed for energizing the coil of a solenoid switch controlling connection of a field weakening resistor in parallel relation to the field winding of a direct current motor.

In addition to the speed responsive means referred to in the preceding paragraph, the invention also provides means for varying, in response to motor temperature, the motor speed at which the field weakening solenoid switch can be connected.

The invention also provides means responsive to motor speed for preventing connection of the field weakening resistor in parallel relation to the field winding in the absence of a motor speed at or above a given speed.

The invention also provides selectively operable means responsive to motor speed for preventing connection of the field weakening resistor in parallel relation to the field winding in the absence of a motor speed at or above either of two given speeds.

The invention also provides means responsive to motor speed for preventing connection of the field weakening resistor in parallel relation to the field winding in the event of an overspeed motor operation.

The invention also provides means responsive to motor speed for preventing overspeeding of a direct current traction motor.

Various additional features and advantages of the embodiments of the invention will become known by reference to the following general description, appended claims, and drawings.

THE DRAWINGS

FIG. 1 is a schematic view of a motor controlling arrangement embodying various of the features of the invention.

FIGS. 2, 3, 4 and 5 are schematic views similar to FIG. 1 illustrating additional motor controlling arrangements embodying various of the features of the invention.

FIG. 9 is a schematic view similar to FIG. 1 illustrating another motor controlling arrangement embodying various of the features of the invention.

FIG. 10 is a schematic view of another motor controlling arrangement embodying various of the features of the invention.

FIGS. 11 and 12 are schematic views similar to FIG. 10 illustrating still further motor controlling arrangements embodying various of the features of the invention.

FIG. 13 is a schematic view of still another motor controlling arrangement embodying various of the features of the invention.

Figure 4:
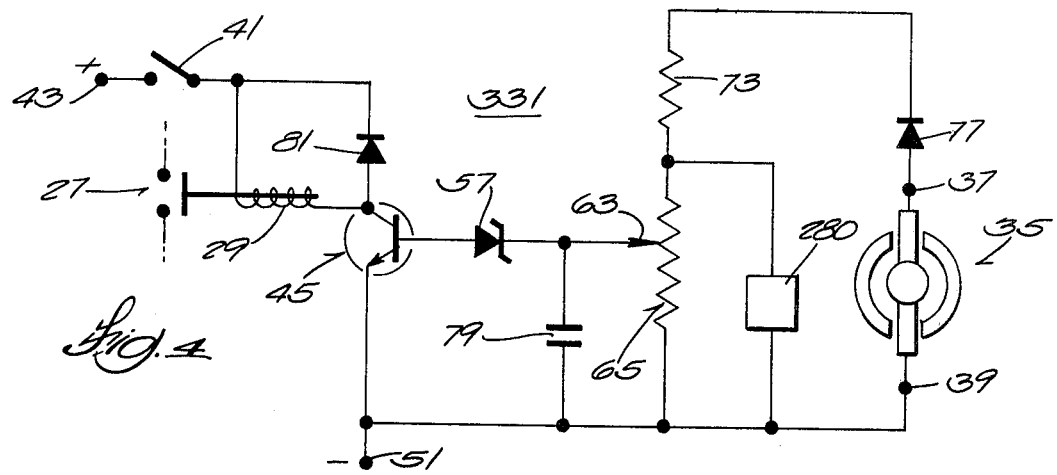

Before explaining the embodiments of the invention in detail, it is to be understood that the invention is not limited in its application to the details of construction and arrangement of parts set forth in the following general description or illustrated in the accompanying drawings, since the invention is capable of other embodiments and of being practiced and carried out in various ways. Also it is to be understood that the phraseology or terminology employed herein is for the purpose of description and should not be regarded as limiting.

GENERAL DESCRIPTION

Shown schematically in FIG. 1 is a direct current traction motor 11 including an armature 13 which is connected in series with a field winding 15 and with any suitable source of direct current, such as a series of batteries 17, together with a speed and direction controller 19 including a main control solenoid switch 21 which is spring or otherwise biased to the open position, and which is closable to energize the motor 11 in response to energizing of a solenoid actuating coil 23 or in response to manual manipulation.

Also included in the motor 11 is a field weakening shunt resistor 25 which is connected in parallel with the field winding 15, subject to the action of a solenoid actuated switch 27, which is spring or otherwise biased to the open position, and which is closable to electrically connect the field weakening resistor 25 in parallel with the field winding 15 in response to energizing of a solenoid coil 29 comprising a part of a control circuit 31.

The control circuit 31 is responsive to motor speed and can be arranged to prevent energizing of the solenoid coil 29 when the motor speed is below a predetermined rate. In the construction shown in FIG. 1, the control circuit 31 is operable to prevent energizing of the coil 29 in the absence of motor speed above a given rate. More specifically, the circuit 31 shown in FIG. 1 includes a direct current generator 35 which is driven, directly or indirectly, by the motor 11, which includes opposed terminals 37 and 39, and which produces a current or signal having potential which is proportional to motor speed. Any suitable generator construction which produces a signal proportional to rotational speed can be employed.

The solenoid coil 29 is connected, at one end, through a suitable manually operated on/off switch or control 41, to one terminal 43 of a source of direct current, such as a battery (not shown) and, at the other end, to an electronic switch in the form of a transistor 45 having a collector 47 connected to the solenoid coil 29, an emitter 49 connected to the other terminal 51 of the source of direct current, and a base 53. In turn, the base 53 is connected to the anode 55 of a zener diode 57 having a cathode 59 which is connected to the wiper 63 of a potentiometer 65 which also includes a resistor 67 connected by a lead 69 to the terminal 51 and to the terminal 39 of the generator 35. The resistor 67 is also connected by a lead 71 including a second resistor 73 connected to the cathode 75 of a diode 77 which, in turn, is connected to the other terminal 37 of the generator 35. The diode 77 prevents damage to the components in the event the generator 35 is rotated in the wrong or reverse direction.

The circuit 31 also includes a capacitor 79 which is connected between the wiper 63 and the terminal 51 and functions to eliminate ripple due to operation of the generator brushes. Still further in addition, the circuit 31 includes a free wheeling diode 81 which shunts the solenoid coil 29.

In operation, and assuming that the operator has closed the switch 41 to energize the solenoid coil 29 so as to weaken the field, and that the engine is operating above the predetermined speed, the generator 35 supplies a current or signal to the potentiometer 65 which is adjusted to provide a voltage at the wiper 63 which breaks down the zener diode 57 and causes current flow through the base-emitter junction so as to turn on the transistor 45 and thereby energize the solenoid coil 29 so as to close the solenoid switch 27 and place the field weakening resistor 25 in parallel connection with the field winding 15.

Because the output signal of the generator 35 is proportional to motor speed, when the motor speed falls below the predetermined level, the voltage at the wiper 63 is insufficient to break down the zener diode 57 and therefore does not turn on the transistor 45. Consequently, the field weakening solenoid switch 27 is not activated, notwithstanding closure of the operator switch or control 41. However, whenever the motor speed rises above the lower predetermined speed, the potential at the wiper 63 will increase so as to break down the zener diode 57 and therefore operate the transistor 45 to energize the solenoid coil 29 and thereby close the solenoid switch 27 to place the field weakening resistor 25 in parallel connection with the field winding 65.

Shown in FIG. 2 is another control circuit 131 for controlling the solenoid switch 27. The control 131 is operable to effect energization of the solenoid coil 29 in the event motor speed exceeds a first lower predetermined speed or limit and is additionally operable to prevent continued energization of the solenoid coil 31 in the event motor speed exceeds an upper predetermined speed or limit. More specifically, the control circuit 131 also includes a generator 35, a potentiometer 65, a transistor 45, and a switch 41, and a zener diode 57, as well as the diodes 77 and 81 and the resistor 73, all of which are arranged in the same manner as in the control 31 illustrated in FIG. 1. In addition, however, the control circuit 131 is arranged to discontinue energization of the solenoid coil 29 in the event motor speed advances beyond the upper predetermined speed or limit.

In this last regard, the control circuit 131 also includes means for preventing conduction of the transistor 45 in response to motor operation above the upper predetermined speed or limit. In the disclosed construction, such means comprises a second potentiometer 179 which includes a wiper 181 operating relative to a resistor 183 which is connected to the generator terminals 37 and 39 in parallel with the potentiometer 65. If desired, an additional resistor 185 in series with the potentiometer resistor 183 can also be employed. In addition, there is also provided a second transistor 187 having a collector 189 connected to the wiper 63 of the first potentiometer 65, an emitter 191 connected to the terminal 51, and a base 193 connected to the anode 195 of a second zener diode 197 having its cathode 199 connected to the wiper 181 of the second potentiometer 179. A capacitor 201 can be connected between the base 193 of the transistor 187 and the terminal 51 to eliminate ripple occasioned by the generator brushes.

The second potentiometer 179 is adjustably set such that when the motor speed reaches the upper speed or limit, the voltage at the wiper 181 of the second potentiometer 179 is sufficient to break down the second zener diode 197 and cause conduction through the base-emitter path of the second transistor 187, thus turning on the second transistor 187 and draining potential/current from the wiper 63 of the first potentiometer 65 and accordingly, dropping the potential at the zener diode 57 to a level below that which will maintain conduction by the zener diode 57 and, accordingly, turning off the first transistor 45. Thus the solenoid coil 29 is de-energized, and the field weakening resistor 25 is disconnected.

Shown in FIG. 3 is a circuit 231 which permits the operator to control energization of the solenoid coil 29 relative to either one of two relatively low motor speeds. More particularly, the circuit 231 also includes a generator 35, a potentiometer 65, a zener diode 57, a transistor 45, and a switch 41, as well as a resistor 73 and diodes 77 and 81, which are arranged in the same manner as disclosed in FIG. 1. Still further in addition, the control circuit 231 includes a second potentiometer 232 which includes a resistor 234 and a wiper 236 and which is connected to the generator terminals 37 and 39 in parallel with the connection of the potentiometer 65. If desired, another resistor 238 can be connected in series with the resistor 234. Also provided, is a second transistor 240 inserted between the transistor emitter 49 and the terminal 51. More particularly, the second transistor includes a collector 242 connected to the emitter 49 of the first transistor 45, an emitter 244 connected to the terminal 51, and a base 246 connected to the anode 248 of a second zener diode 250 having a cathode 252 connected to the wiper 236 of the second potentiometer 232.

The first potentiometer 65 is adjusted so as to provide at the wiper 63, a potential which is effective to break down the first zener diode 57 and turn on the first transistor 45 at a relative high low speed. In addition, the second potentiometer 232 is adjusted so as to provide a potential at the wiper 236 which will break down the zener diode 248 at a relatively low low speed and thereby turn on the second transistor 240. As thus far explained, in order for the solenoid coil 29 to be energized, both transistors 45 and 240 must be conducting, and accordingly, the solenoid coil 29 will be energized to close the field weakening solenoid switch 27 only when the motor is operating at a relatively high low speed.

However, means are additionally provided for selectively turning on the first transistor 45 independently of the occurrence of a motor speed at or above the relatively high low speed. In this regard, the control circuit 231 also includes a lead 260 which is connected to a direct current source terminal 262 of opposite polarity from the terminal 51, which includes an off/on switch 264 operable by the operator, which can include a resistor 263, and which is connected to the base 53 of the first transistor 45. When the switch 264 is in the off position, the first transistor 45 is turned on in response to breaking down of the first zener diode 57 whenever the motor speed reaches the relatively high low speed. However, when the switch 264 is in the on position, voltage is applied to the base 53 of the first transistor to turn it on independently of the rate of motor speed. Thus the solenoid coil 29 can be energized, assuming the switch 264 (as well as the switch 41) is turned on by the operator, at or above the relatively low low speed which is operable to turn on the second transistor 240.

The control circuit 231 also includes diodes 266 and 268 which prevent interaction of the two bias sources which are selectively operable to turn on the first transistor 45. In addition, capacitors 270 and 272 are respectively coupled between the bases 53 and 246 of the transistors 45 and 240 and the terminal 51 to eliminate ripple due to operation of the generator brushes.

If desired, the features of the control circuit 231 can be incorporated in the control circuit 131 shown in FIG. 2 by addition of the lead 260 and associated components and by adding the potentiometer 232, transistor 240, and diode 248 in the same relation to the transistor 45 and potentiometer 67.

Shown in FIG. 4 is another control circuit 331 which incorporates the control circuit 31 described in connection with FIG. 1 and which additionally includes means sensitive to motor temperature for varying the motor speed level which will be effective to cause break down of the zener diode 57 and hence energization of the solenoid coil 29. In the FIG. 4 control circuit 331, there is provided means for increasing the speed level at which the solenoid coil 29 is energized in response to increasing motor temperature. Such action reduces motor duty and thermal dissipation.

In this last regard, the control 331 additionally includes a temperature responsive component or element 280 which has a negative temperature coefficient of resistance, i.e. which exhibits decreasing resistance in response to increasing temperature. As shown in FIG. 4, the temperature responsive element or component 280 is connected in the circuit 331 in parallel with the potentiometer 65. Accordingly, as the temperature of the motor increases, the resistance of the component 280 decreases thereby requiring generation by the generator 35 of a greater potential to provide, at the wiper 63, sufficient potential to break down the zener diode 57. Thus, increased motor speed is required to effect energization of the solenoid switch 27 in response to increasing motor temperature.

Figure 5:
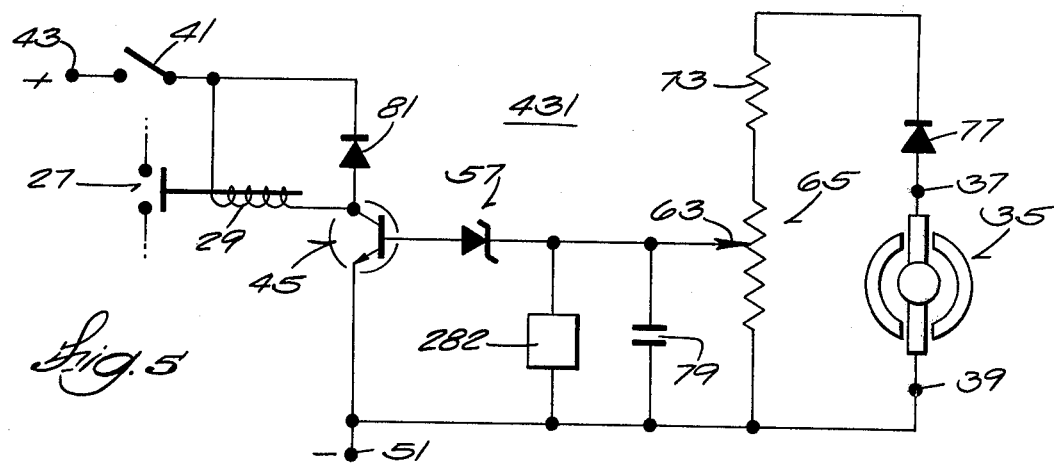

Shown in FIG. 5 is another control circuit 431 which is identical to that shown in FIG. 4 except for omission of the component 280 and except for incorporation of a temperature responsive component 282 which has a negative coefficient of resistance, which is connected between the wiper 63 and the terminal 51, and which is therefore in parallel relation to the zener diode base-emitter current path.

Figures 6, 7, 8:
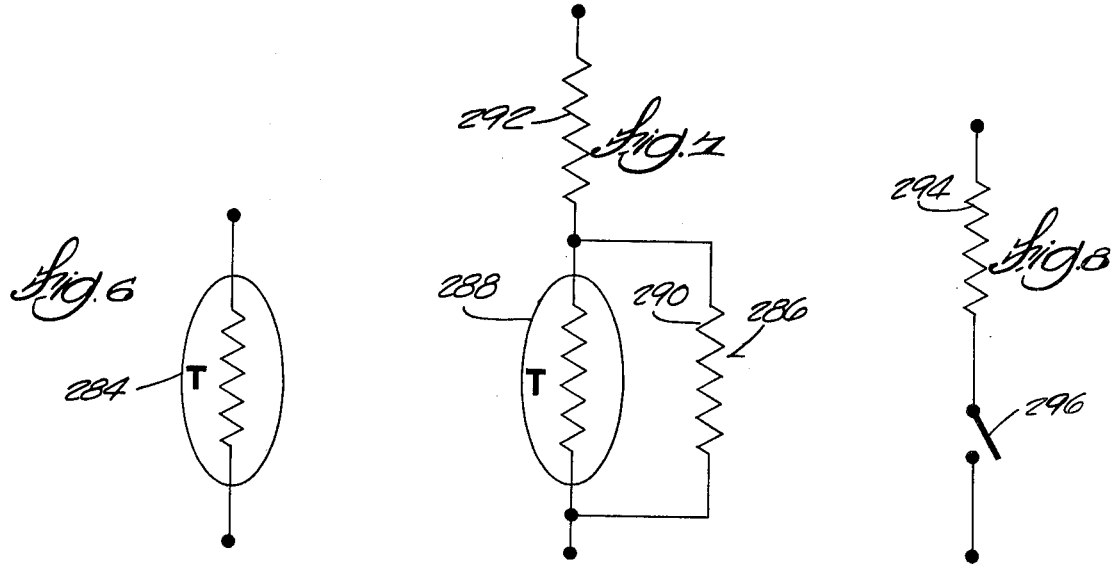
FIGS. 6, 7 and 8 are schematic views illustrating different forms of components which can be used in the circuits shown in FIGS. 4 and 5.

The temperature responsive components 280 and 282 included in the control circuits 331 and 431 illustrated in FIGS. 4 and 5 can comprise either a simple thermistor 284 as shown in FIG. 6, or a thermistor/resistor combination 286 which is shown in FIG. 7 and which includes a thermistor 288 in parallel connection with a resistor 290, which arrangement is in series with another resistor 292. If desired, the temperature responsive component having a negative temperature coefficient of resistance can comprise, as shown in FIG. 8, a resistor 294 in series connection with a thermal switch 296 which is normally open and which closes with increasing temperature.

The arrangements shown in FIGS. 6 and 7 provide a progressive increase in resistance with increasing temperature, whereas the arrangement shown in FIG. 8 provides a step increase in resistance upon attainment of increased temperature. Other constructions can be employed to provide a temperature sensitive component having a negative temperature coefficient of resistance.

Shown in FIG. 9 is another temperature responsive control circuit 531 which is identical to the circuit shown in FIG. 4 except that the temperature responsive component 280 is ommitted and except that a temperature responsive component 298 is included in parallel connection to the resistor 73, which component 298 exhibits a positive temperature coefficient of resistance, i.e. the resistance of the component increases with temperature. While other constructions could be employed, one such component includes a resistor 300 in series with a thermal switch 302 which is normally closed and which opens upon an increase in temperature, thereby eliminating the parallel connection of the resistor 300 with the resistor 73 and thereby requiring a greater motor speed to generate a potential at the wiper 63 sufficient to break down the zener diode 57 and thereby place the field weakening winding 25 in parallel connection with the field winding 15.

If desired, the features of the temperature responsive control circuits 331, 431 and 531 shown in FIGS. 4, 5 and 9 can be incorporated with the controls 131 and 231 shown in FIGS. 2 and 3.

Shown in FIG. 10 is still another control circuit 631 for operating a solenoid actuated switch 27 controlling connection of the field weakening resistor 25 in parallel relation to the field winding 15 of a direct current motor 11 as already explained in connection with FIG. 1. In the control circuit 631 shown in FIG. 11, the actuating coil 29 of the solenoid switch 27 is connected between the opposed terminals 43 and 51 of a source of direct current and in series with a first manually controlled off/on switch 41, together with a second switch 632 which is also connected in series with the solenoid actuating coil 29 and which is held open by action of a governor 634 in the absence of governor rotation above a predetermined limit or rate. When the governor 634 rotates above the predetermined rate, the switch 632 is closed, thereby energizing the solenoid actuating coil 29 and thereby connecting the field weakening resistor 25 in parallel relation with the field winding 15. Any suitable governor controlled switching construction can be employed. As such constructions are believed to be well known in the art, further description thereof is ommitted.

Accordingly, when the operator closes the switch 41, connection of the field weakening resistor 25 to the field winding 15 in parallel relation by the solenoid actuating coil 29 will occur whenever the rate of governor rotation (and therefor motor speed) increases to or above the predetermined limit. Furthermore, assuming closure of the governor control switch 632, whenever the rotational speed drops below the predetermined limit or rate, the switch 632 will consequently open, removing the field weakening resistor 25 from parallel connection to the field winding 15.

Shown in FIG. 11 is another control circuit 731 which is identical to the circuit 631 shown in FIG. 10 except that another switch 636 is connected in series with the switches 41 and 632, which switch 636 is also controlled by a governor 638, which is closed in the absence of governor speed above a predetermined rate, and which functions as an overspeed control, i.e., which opens in response to rotational speed above a predetermined rate higher than the rate associated with the switch 632. Thus, overspeed of the motor with the field weakening resistor 25 in parallel connection to the field winding 15 is prevented. Various governor controlled switch constructions can be employed. As such contructions are believed to be well known in the art, further description thereof is omitted.

Shown in FIG. 12 is another control circuit 831 which is identical to the control circuit 731 shown in FIG. 11 except that a temperature responsive switch or component 640 is connected in series with the switches 41, 632 and 636. The component or switch 640 includes a thermal sensing element (not shown) which is closed in the absence of motor temperature above a preset limit, and which opens upon increase in motor temperature above a preset limit. Thus, in the event operation of the motor with the field weakening resistor 25 in parallel connection with the field winding 15 causes heating of the motor above the preset limit, the switch 640 opens so as to effect discontinuation of the parallel connection of the field weakening resistor 25 with the field winding 15. The temperature responsive switch 640 can, of course, also be employed in series with the switch 632 shown in FIG. 10.

If desired, overspeed control or temperature responsive control as obtained in the circuits 731 and 831 shown in FIGS. 11 and 12 can also be employed in cooperation with the control circuits 131, 231, 331, 431 and 531 shown respectively in FIGS. 1 through 5 and 9 by arranging either or both the switches 636 and 640 in series connection with the transistor switch 45.

Shown in FIG. 13 is a control circuit 931 which can be employed to prevent overspeed of a motor 11, either with or without connection of the field weakening resistor 25. The control circuit 931 is similar to some extent to the control circuit 31 shown in FIG. 1 except for substitution of the actuating coil 23 of the main control switch 21 instead of the coil 29 and except as otherwise disclosed below. Thus, the same reference numerals which have been applied in FIG. 1 have also been applied to FIG. 13 with reference to the same components.

Apart from inclusion of the coil 23 in the circuit 931 as distinguished from the coil 29, the circuit 931 also differs from the circuit 31 of FIG. 1 to the extent that the circuit 931 includes means for retaining the transistor 45 in a conducting state whenever the switch 41 is on and regardless of motor speed (or no motor speed) so long as the motor speed does not exceed a predetermined limit. In addition, the circuit 391 includes a means for turning off the transistor 45 in the event of an overspeed condition.

In this last regard, the means of retaining the transistor 45 in a conducting state so long as motor speed does not exceed the predetermined limit comprises a resistor 942 which is connected between the terminal 43 and the base 53 of the transistor 45. In the specifically disclosed construction, the resistor 942 is connected between the transistor base 53 and the anode of the diode 81.

The means for turning off the transistor 45 in response to occurrence of an overspeed condition includes a second transistor 944 having a collector 946 connected to the base 53 of the transistor 45, an emitter 948 connected to the terminal 51, and a base 950 connected to the anode 55 of the zener diode 57 which, in turn, is connected to the wiper 63 of the potentiometer 65.

In the absence of an overspeed condition, the potential at the wiper 63 is insufficient to break down the zener diode 57 and hence the transistor 944 remains in an off condition and accordingly does not affect the conducting state of the transistor 45. However, whenever the motor speed exceeds the predetermined limit, the potential at the wiper 63 is sufficient to break down the zener diode 57 and thereby to turn on the second transistor 944. Such action diverts or robs the transistor 45 of its base current and thereby turns off the transistor 45, thereby also de-energizing the solenoid coil 23 and permitting opening of the switch 21 by the external bias thereof.

Thus, the main control switch 21 is closed for motor operation at all speeds below the predetermined level and will automatically be opened when motor overspeed causes generation of potential at the wiper 63 sufficient to break down the zener diode 57. As a consequence, overspeeding of the motor 11 can be eliminated regardless of whether the field weakening resistor 25 is or is not connected in parallel with the field winding 15.

It is to be understood that the arrangement shown in FIG. 13 can be employed in conjunction with, and in addition to any of the control circuits shown in FIGS. 1 through 5, and 9 through 12 to provide overspeed control while also providing control of the field weakening resistor 25. In connection with the control circuits shown in FIGS. 1 through 5 and 9, the same generator 75 can be employed for generating potential for operating the control circuit 931 of FIG. 13 as well as the control circuits of FIGS. 1 through 5 and 9.

Various of the features of the invention are set forth in the following claims.

What is claimed is:

1. A control comprising a direct current motor including a field winding and a field weakening resistor, a field weakening solenoid switch connected to said field weakening resistor and including a solenoid coil, switch means connected to said coil for selectively connecting said coil to a source of direct current and thereby operate said solenoid switch to connect said field weakening resistor in parallel with said field winding, and means responsive solely to motor speed for operating said switch means.

2. A control in accordance with claim 1 wherein said speed responsive means comprises mechanical means for operating said switch means.

3. A control in accordance with claim 2 wherein said mechanical means comprises a governor rotated by the motor for operating said switch means.

4. A control in accordance with claim 3 wherein said switch means comprises a first switch which is operated by said governor and which is open below a given governor speed and which is closed above a given governor speed.

5. A control in accordance with claim 4 and further including a second switch responsive to motor temperature and connected in series with said first switch, said second switch being closed below a predetermined temperature and opened above the predetermined temperature.

6. A control in accordance with claim 5 and further including a second governor rotated by the motor and a third switch which is connected in series with said first and second switches, which is operated by said second governor and which is closed below a given governor speed and opened above a given governor speed.

7. A control in accordance with claim 4 and further including a second governor and a second switch which is connected in series with said first switch, and which is operated by said second governor, and which is closed below a given governor speed and opened above a given governor speed.

8. A control in accordance with claim 1 wherein said switch means comprises an electronic switch and wherein said speed responsive means comprises means for generating an electrical signal proportional to motor speed, and circuit means for applying the signal to operate said switch.

9. A control in accordance with claim 8 wherein said circuit means includes means for preventing operation of said switch to connect the coil to the source of direct current so as to weaken the field in the absence of motor operation above a given speed.

10. A control in accordance with claim 9 wherein said circuit means includes means for preventing operation of said switch to connect the coil to the source of direct current so as to weaken the field when the motor is operating above a second given speed higher than the first mentioned given speed.

11. A control in accordance with claim 9 and further including means responsive to motor temperature for modifying the operation of said switch.

12. A control in accordance with claim 11 wherein said means responsive to motor temperature has a negative coefficient of resistance.

13. A control in accordance with claim 12 wherein said means responsive to motor temperature comprises a thermister.

14. A control in accordance with claim 12 wherein said means responsive to motor temperature comrpises a thermister, a first resistor connected in parallel with said thermister, and a second resistor connected in series with the parallel connection of said thermister and said first resistor.

15. A control in accordance with claim 12 wherein said means responsive to motor temperature comprises a resistor and a thermal switch which is connected in series with said resistor, which is opened below a predetermined motor temperature, and which is closed above the predetermined motor temperature.

16. A control in accordance with claim 11 wherein said means responsive to motor temperature has a positive coefficient of resistance.

17. A control in accordance with claim 16 wherein said means responsive to motor temperature comprises a resistor and a thermal switch which is connected in series with said resistor, which is closed below a predetermined motor temperature, and which is opened above the predetermined motor temperature.

18. A control in accordance with claim 9 wherein said electronic switch is a transistor having a collector-emitter path connected in series with the solenoid coil and with the source of direct current, said transistor also including a base, and wherein said means for preventing operation of said switch in the absence of motor operation above a given speed comprises a zenor diode having an anode connected to said base and a cathode, and a potentiometer including a resistor connected to said signal generating means, said potentiometer including a wiper connected to said zenor diode cathode and being set to turn on said transistor in response to motor speed above a predetermined level.

19. A control in accordance with claim 18 wherein said circuit means includes means for preventing operation of said switch to connect the coil to the source of direct current so as to weaken the field when the motor is operating above a second given speed higher than the first mentioned given speed.

20. A control in accordance with claim 18 wherein said means for preventing operation of said switch when the motor is operating above the second given speed includes a second transistor having a collector-emitter path extending from said wiper of said first mentioned potentiometer in parallel with the collector-emitter path of said first transistor, said second transistor also including a base, a second zener diode having an anode connected to said base of said second transistor and a cathode, and a second potentiometer including a resistor connected to said signal generating means in parallel with the connection of said first mentioned potentiometer, said second potentiometer including a second wiper connected to said second zener diode cathode and being set to turn on said second transistor in response to motor speed above the second given speed.

21. A control in accordance with claims 18 and further including means responsive to motor temperature for modifying the operation of said switch.

22. A control in accordance with claim 21 wherein said means responsive to motor temperature varies the potential supplied by said signal generating means at said wiper.

23. A control in accordance with claim 21 wherein said means responsive to motor temperature has a negative coefficient of resistance.

24. A control in accordance with claim 23 wherein said means responsive to motor temperature is connected in said circuit means in parallel relation to said potentiometer.

25. A control in accordance with claim 23 wherein said means responsive to motor temperature is connected in said circuit means to said wiper of said potentiometer in parallel relation to the current path through said zener diode and said base and emitter of said transistor.

26. A control in accordance with claim 23 wherein said means responsive to motor temperature comprises a thermister.

27. A control in accordance with claim 23 wherein said means responsive to motor temperature comprises a thermister, a first resistor connected in parallel with said thermister, and a second resistor connected in series with the parallel connection of said thermister and said first resistor.

28. A control in accordance with claim 23 wherein said means responsive to motor temperature comprises a resistor and a thermal switch which is connected in series with said resistor, which is opened below a predetermined motor temperature, and which is closed above the predetermined motor temperature.

29. A control in accordance with claim 21 wherein said means responsive to motor temperature has a positive coefficient of resistance.

30. A control in accordance with claim 29 wherein said circuit means includes a second resistor connected in said circuit means in series with said potentiometer and wherein said means responsive to motor temperature is connected in said circuit means in parallel with said second resistor.

31. A control in accordance with claim 29 wherein said means responsive to motor temperature comprises a resistor and a thermal switch which is connected in series with said resistor, which is closed below a predetermined motor temperature, and which is opened above the predetermined motor temperature.

32. A control in accordance with claim 1 wherein said switch means comprises an electronic switch and wherein said speed responsive means comprises means for generating an electric signal proportional to motor speed, and circuit means for selectively applying the signal to operate said switch so as to connect the solenoid coil to the source of direct current when the motor is operating at or above either of two speeds.

33. A control in accordance with claim 32 wherein said electronic switch comprises a first transistor having a collector-emitter path connected in series with the solenoid coil and with the source of direct current, said transistor also including a base, and wherein said circuit means comprises first means connected to said base of said transistor for turning on said transistor in response to motor speed at or above the higher of the two motor speeds, second means connected to said base of said transistor for selectively turning on said transistor independently of motor speed, and third means connected to the collector-emitter path of said transistor for preventing connection of the coil to the direct current source in the absence of a motor speed at or above the lower of the two motor speeds.

34. A control in accordance with claim 33 wherein said first means applies potential generated by said signal generating means to said transistor base, wherein said second means comprises a first zener diode having an anode connected to said base of said transistor and a cathode, a first potentiometer including a resistor connected to said signal generating means, said first potentiometer also including a wiper connected to said first zener diode and being set to turn on said transistor in response to motor speed at or above the higher of the two motor speeds, and wherein said third means comprises a second transistor having a collector-emitter path connected in series with the collector-emitter path of said first mentioned transistor and a base, a second zener diode having an anode connected to said base of said second transistor and a cathode, and a second potentiometer including a resistor connected to said signal generating means in parallel with the connection of said resistor of said first potentiometer, said second potentiometer also including a wiper connected to said second zener diode cathode and being set so as to turn on said second transistor in response to motor speed at or above the lower of the two motor speeds.

35. A control comprising a direct current motor including a field winding and a field weakening resistor, a field weakening solenoid switch connected to said field weakening resistor and including a solenoid coil, switch means connected to said coil for selectively connecting said coil to a source of direct current and thereby operate said solenoid switch to connect said field weakening resistor in parallel with said field winding, means responsive directly to motor speed for operating said switch means, and means responsive to motor temperature for modifying operation of said switch means by said speed responsive means.

36. A control comprising a direct current motor including a field winding and a field weakening resistor, a field weakening solenoid switch connected to said field weakening resistor and including a solenoid coil, switch means connected to said coil for selectively connecting said coil to a source of direct current and thereby operate said solenoid switch to connect said field weakening resistor in parallel with said field winding, and means responsive solely to motor temperature for operating said switch means.

37. A control in accordance with claim 36 wherein said switch means is closed when the motor is below a predetermined temperature and wherein said means responsive to motor temperature operates to open said switch means when the motor is above the predetermined temperature.

38. An overspeed control comprising a direct current motor, a solenoid switch which controls energization of said direct current motor, which is biased open, and which includes a solenoid coil operable in response to energization thereof to close said solenoid switch, switch means connected to said coil for selectively connecting said coil to a source of direct current, and means responsive solely to motor speed for operating said switch means to control energization of said direct current motor.

39. A control in accordance with claim 38 wherein said switch means comprises an electronic switch and wherein said speed responsive means comprises means for generating an electrical signal proportional to motor speed, and circuit means for applying said signal to operate said switch.

40. A control in accordance with claim 39 wherein said switch means comprises a first transistor having a collector-emitter path connected in series with the coil, and a base, wherein the control further includes means for applying potential to said base of said first transistor to turn on said first transistor independently of motor speed, wherein said speed responsive means comprises means for generating a signal proportional to motor speed, and wherein said circuit means includes means for applying the signal to turn off said first transistor in response to operation of the motor above a predetermined speed.

41. A control in accordance with claim 40 wherein said circuit means comprises a second transistor having a collector-emitter path connected to said base of said first transmitter, said second transistor also including a base, a zener diode having an anode connected to said base of said second transistor and a cathode, and a potentiometer having a resistor connected to said signal generating means, said potentiometer also including a wiper connected to the cathode of said zener diode and being set so as to turn on said second transistor and thereby turn off said first transistor in response to operation of the motor above the predetermined speed.

* * * * *